US009671572B2

(12) United States Patent
Decker et al.

(10) Patent No.: US 9,671,572 B2
(45) Date of Patent: Jun. 6, 2017

(54) INTEGRATED CHIP PACKAGE WITH OPTICAL INTERFACE

(71) Applicant: Oracle International Corporation, Redwood City, CA (US)

(72) Inventors: Patrick J. Decker, San Jose, CA (US); Kannan Raj, San Diego, CA (US); Alan T. Hilton-Nickel, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/492,816

(22) Filed: Sep. 22, 2014

(65) Prior Publication Data

US 2016/0085038 A1   Mar. 24, 2016

(51) Int. Cl.
  *G02B 6/12*  (2006.01)
  *G02B 6/42*  (2006.01)

(52) U.S. Cl.
  CPC ........... *G02B 6/4204* (2013.01); *G02B 6/428* (2013.01); *G02B 6/423* (2013.01); *G02B 6/4269* (2013.01)

(58) Field of Classification Search
  CPC . H01L 2924/01079; H01L 2924/01078; H01L 2924/14; H01L 2924/01029; H01L 2924/01013; H01L 2224/16; H01L 2224/48091; G02B 6/42; G02B 6/12004; G02B 6/4214; G02B 6/12007
  USPC ......... 257/432, 787–796, E23.001–E23.194; 438/31, 27, 26, 51, 55, 64, 106–127; 385/14
  See application file for complete search history.

(56) References Cited

U.S. PATENT DOCUMENTS

| | | | |
|---|---|---|---|
| 2002/0196997 A1* | 12/2002 | Chakravorty | G02B 6/42 385/14 |
| 2005/0097378 A1* | 5/2005 | Hwang | 713/320 |
| 2011/0206379 A1* | 8/2011 | Budd et al. | 398/116 |
| 2012/0224804 A1* | 9/2012 | Hashimoto et al. | 385/14 |
| 2013/0015578 A1* | 1/2013 | Thacker et al. | 257/738 |
| 2013/0156366 A1* | 6/2013 | Raj | G02B 6/1228 385/14 |
| 2013/0230272 A1* | 9/2013 | Raj et al. | 385/14 |

(Continued)

*Primary Examiner* — Thao X Le
*Assistant Examiner* — Nduka Ojeh
(74) *Attorney, Agent, or Firm* — Park, Vaughan, Fleming & Dowler LLP

(57) ABSTRACT

A chip package includes an integrated circuit and an optical integrated circuit (such as a hybrid integrated circuit) with an optical source and/or an optical receiver. The integrated circuit and the optical integrated circuit may be proximate to each other on opposite sides of an interposer in the chip package. Moreover, the integrated circuit may include a driver circuit of electrical signals for the optical source and/or a receiver circuit of electrical signals from the optical receiver. Furthermore, the optical integrated circuit may be positioned in a hole or an etch pit in a substrate, and an alignment feature may mechanically couple the substrate to an optical-fiber assembly, so that the optical-fiber assembly is positioned relative to the interposer and the optical integrated circuit. In particular, the optical-fiber assembly may partially overlap the interposer, so that optical signals are provided and/or received from the optical integrated circuit through the interposer.

20 Claims, 6 Drawing Sheets

(56) References Cited

U.S. PATENT DOCUMENTS

2014/0044388 A1\* 2/2014 Su et al. .......................... 385/14
2014/0294342 A1\* 10/2014 Offrein ................ G02B 6/4214
385/14

\* cited by examiner

INTEGRATED CHIP PACKAGE WITH OPTICAL INTERFACE

BACKGROUND

Field

The present disclosure generally relates to a chip package that accommodates semiconductor chips. More specifically, the present disclosure relates to a hybrid-integrated chip package that includes a substrate with adjacent payload and photonic chips, and which has one or more high-speed optical serial data interfaces.

Related Art

As integrated-circuit (IC) technology continues to scale to smaller critical dimensions, it is increasingly difficult for existing interconnection technologies to provide suitable communication characteristics, such as: high bandwidth, low power, reliability and low cost. Engineers and researchers are investigating a variety of interconnect technologies to address these problems, and to enable future high-density, high-performance systems.

One interconnect technology to address these challenges, which is the subject of ongoing research, is optical communication. In principle, optical communication can be used to communicate large amounts of data. However, while photonic technologies based on vertical cavity surface-emitting lasers (VCSELs) and optical fibers are typically a convenient and cost-effective solution to communicate modest amounts of data in certain parts of systems (such as between racks and, in certain cases, between boards within a rack), it is often difficult to scale these photonic components to meet the bandwidth, size, and power requirements of input/output (I/O) interfaces for future chips.

Alternatively, optical interconnects or links based on silicon photonics are attractive candidates for interconnect technology because they can be readily scaled on optical integrated circuits. However, it can be difficult to integrate optical integrated circuits with conventional integrated circuits in existing chip packages.

Hence, what is needed is a chip package that does not suffer from the above-described problems.

SUMMARY

One embodiment of the present disclosure provides a chip package that includes an integrated circuit having an end and a front surface with an integrated-circuit connector pad, where the integrated circuit includes: a driver circuit of an electrical signal for an optical source in an optical integrated circuit, and/or a receiver circuit of a second electrical signal from an optical receiver in the optical integrated circuit. Moreover, the chip package includes: an integrated-circuit electrical connector electrically coupled to the integrated-circuit connector pad; and an interposer having an end, a top surface and a bottom surface, where the end of the interposer is horizontally displaced from the end of the integrated circuit, the top surface faces the front surface and has a first interposer connector pad electrically coupled to the integrated-circuit electrical connector, and the bottom surface is on an opposite side of the interposer from the top surface and has a second interposer connector pad electrically coupled to the first interposer connector pad by a via through the interposer. Furthermore, the chip package includes: an optical-integrated-circuit electrical connector electrically coupled to the second interposer connector pad; and the optical integrated circuit having a front surface, facing the bottom surface of the interposer, with an optical-integrated-circuit connector pad electrically coupled to the optical-integrated-circuit electrical connector, where the optical integrated circuit includes: the optical source that, during operation, outputs an optical signal based on the electrical signal, and/or the optical receiver that, during operation, receives a second optical signal and outputs the second electrical signal. Additionally, the chip package includes an optical-fiber assembly having an end facing the end of the integrated circuit and positioned above the interposer and the optical integrated circuit, where the optical-fiber assembly partially overlaps the interposer, and where the optical integrated circuit is positioned so that: the optical signal is provided to the optical-fiber assembly through the interposer, and/or the second optical signal is received from the optical-fiber assembly and is provided to the optical integrated circuit through the interposer.

Note that the interposer may include a trace on at least one of the front surface and the bottom surface that is electrically coupled to the first interposer connector pad and the second interposer connector pad, and the trace may horizontally displace the first interposer connector pad and the second interposer connector pad.

In some embodiments, the chip package includes a substrate, and the optical integrated circuit is coupled to the substrate by a heat sink. For example, the optical integrated circuit may be positioned in: a hole, defined by sides, through the substrate, and/or an etched pit, defined by sides, in the substrate.

Moreover, the interposer may include an optical component that, during operation: focuses the optical signal on the optical-fiber assembly, and/or focuses the second optical signal on the optical integrated circuit.

In some embodiments, the chip package includes a connector that remateably couples to the optical-fiber assembly.

Furthermore, the chip package may include an alignment feature that positions the optical-fiber assembly relative to the interposer and the optical integrated circuit.

Additionally, the chip package may include: a second integrated circuit having a front surface with a second integrated-circuit connector pad, where the front surface of the second integrated circuit faces the top surface of the interposer; a second integrated-circuit electrical connector electrically coupled to the second integrated-circuit connector pad; a third interposer connector pad on the top surface of the interposer electrically coupled to the second integrated-circuit electrical connector; a trace on the top surface electrically coupled to the third interposer connector pad; a fourth interposer connector pad on the top surface of the interposer electrically coupled to the trace; a third integrated-circuit electrical connector electrically coupled to the fourth interposer connector pad; and a third integrated-circuit connector pad on the front surface of the integrated circuit and electrically coupled to the third integrated-circuit electrical connector.

Note that the integrated circuit may include a physical-medium dependent integrated circuit. Moreover, the interposer may include glass that is optically transparent at a wavelength of: the optical signal and/or the second optical signal.

Furthermore, the communication between the integrated circuit and the optical integrated circuit may be unidirectional.

In some embodiments, the chip package includes multiple instances of optical sources and optical detectors in the optical chip package, where the optical sources and the optical detectors have corresponding unidirectional electrical paths between the integrated circuit and the optical integrated circuit via the interposer. In particular, a given optical source may be adjacent to a given optical detector, where the corresponding unidirectional electrical paths for the optical sources may be interleaved with the corresponding unidirectional electrical paths for the optical detectors. Alternatively or additionally, the optical sources may be arranged in groups of N and the optical detectors may be arranged in groups of M, where the corresponding unidirectional electrical paths for the optical sources are arranged adjacent to each other in groups of N and the corresponding unidirectional electrical paths for the optical detectors may be arranged adjacent to each other in groups of M.

Another embodiment provides a system that includes: a processor, a memory, and the chip package.

Another embodiment provides a method for communicating information, which may be performed by the chip package. During operation, the integrated circuit conveys an electrical signal to the optical integrated circuit via a unidirectional electrical path, where the integrated circuit includes the driver circuit of the electrical signal for the optical source in the optical integrated circuit, where the unidirectional electrical path is mediated by the interposer having vias that is between the integrated circuit and the optical integrated circuit, and where the end of the interposer extends past the end of the integrated circuit. Moreover, the optical source in the optical integrated circuit outputs the optical signal based on the electrical signal. Furthermore, the interposer optically couples the optical signal to the optical-fiber assembly, where the optical-fiber assembly has the end facing the end of the integrated circuit and is positioned above the interposer and the optical integrated circuit, and where the optical-fiber assembly partially overlaps the interposer.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a chip package, a system that includes the chip package, and a technique for communicating information in the chip package are described. This chip package may include an integrated circuit and an optical integrated circuit (such as a hybrid integrated circuit) with an optical source and/or an optical receiver. The integrated circuit and the optical integrated circuit may be proximate to each other on opposite sides of an interposer in the chip package. Moreover, the integrated circuit may include a driver circuit of electrical signals for the optical source and/or a receiver circuit of electrical signals from the optical receiver. Furthermore, the optical integrated circuit may be positioned in a hole or an etch pit in a substrate, and an alignment feature may mechanically couple the substrate to an optical-fiber assembly, so that the optical-fiber assembly is positioned relative to the interposer and the optical integrated circuit. Additionally, the optical-fiber assembly may partially overlap the interposer, so that optical signals are provided and/or received from the optical integrated circuit through the interposer.

By integrating the integrated circuit and the optical integrated circuit in close proximity, the chip package may facilitate improved performance compared to chip packages with electrical interconnects. In particular, the chip package may electrically couple the integrated circuit and the optical integrated circuit using very-short electrical traces or links that enable very-high-speed electrical-to-optical and optical-to-electrical conversions for interconnect channels. This may allow the optical integrated circuit to provide very-high-bandwidth communication via the optical-fiber assembly without losses in the electrical traces or links limiting the overall interface data rate in the chip package. Consequently, the chip package may provide multi-terabit per second optical communication in conjunction with high-performance electrical circuits. In this way, the chip package may meet the escalating demands of off-chip bandwidth, while providing higher bandwidth density and improved energy efficiency compared to existing electrical interconnects.

We now describe the chip package. Hybrid integration is a pragmatic approach that allows silicon photonic devices and VLSI circuits to be combined. The chip package described here contains hybrid-integrated electronic-photonic elements, where the electronics and photonics have been built on individually optimized technology platforms and then bonded together using a low-parasitic flip-chip-assembly technique, such as thermocompression or reflow bonding.

Figure 1:
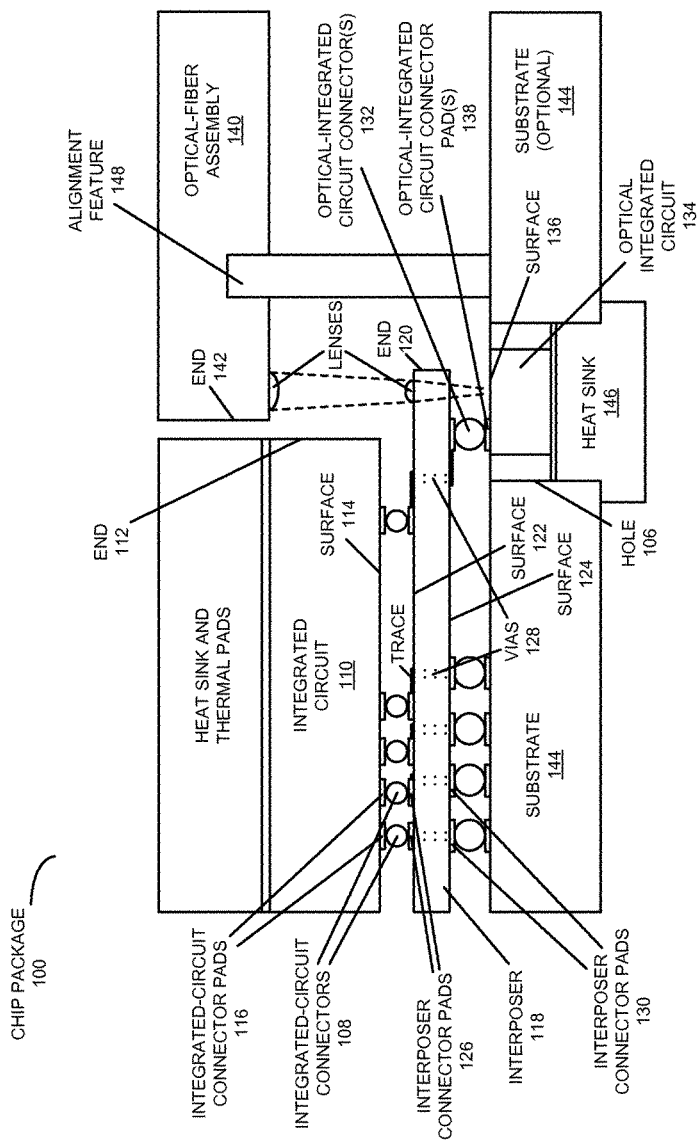
FIG. 1 is a block diagram illustrating a side view of a chip package in accordance with an embodiment of the present disclosure.

FIG. 1 presents a block diagram illustrating a side view of a chip package 100, such as a wavelength-division-multiplexing photonic input/output (I/O)-enabled hybrid-integrated chip package. In chip package 100, integrated circuit 110 (such as a switch chip or a high-performance processor that requires ultrahigh off-chip bandwidth, and which is sometimes referred to as a 'payload IC') may be flip-chip bonded to interposer 118. In particular, chip package 100 may include: integrated circuit 110 having an end 112 and a surface 114 with one or more integrated-circuit connector pads 116 (i.e., disposed on surface 114). This integrated circuit may include: a driver circuit of an electrical signal for an optical source (or gain material) in an optical integrated circuit 134 (which is sometimes referred to as a 'photonic IC'), and/or a receiver circuit of another electrical signal from an optical receiver in optical integrated circuit 134. In an exemplary embodiment, optical integrated circuit 134 is fabricated on a silicon-on-insulator substrate and includes optical components, such as: optical waveguides, modulators, photodetectors, etc.

Moreover, chip package 100 may include: one or more integrated-circuit electrical connectors 108 electrically coupled to the one or more integrated-circuit connector pads 116. Interposer 118 may have an end 120 and surfaces 122 and 124, where end 120 of interposer 118 is horizontally displaced from end 112, surface 122 faces surface 114 and has one or more interposer connector pads 126 electrically coupled to the one or more integrated-circuit electrical connectors 108, and surface 124 is on an opposite side of interposer 118 from surface 122 and has one or more interposer connector pads 130 electrically coupled to the one or more interposer connector pads 126 by one or more vias 128 through interposer 118 (such as through-interposer vias or TIVs having widths of 50-200 μm). For example, interposer 118 may include one or more traces on at least one of surfaces 122 and 124, and the one or more traces may be electrically coupled to the one or more interposer connector pads 126 and 130 (and, thus, may horizontally displace the one or more interposer connector pads 126 and 130, e.g., by less than 1-10 mm).

Furthermore, chip package 100 may include: one or more optical-integrated-circuit electrical connectors 132 electrically coupled to the one or more interposer connector pads 130; and optical integrated circuit 134 having surface 136, facing surface 124, with one or more optical-integrated-circuit connector pads 138 electrically coupled to the one or more optical-integrated-circuit electrical connectors 132. Note that optical integrated circuit 134 may include: the optical source (such as a laser or a light-emitting diode, e.g., a vertical cavity surface-emitting laser) that, during operation, outputs an optical signal based on the electrical signal, and/or the optical receiver (such as a photodetector) that, during operation, receives another optical signal and outputs the other electrical signal. Moreover, optical integrated circuit 134 may include an optical waveguide. Note that the communication between integrated circuit 110 and optical integrated circuit 134 may be unidirectional.

In some embodiments, chip package 100 includes a substrate 144, and optical integrated circuit 134 is coupled to substrate 144 by heat sink 146. For example, optical integrated circuit 134 may be positioned in a hole 106 through substrate 144, which is defined by edges or sides). Alternatively, as shown below in FIG. 2, optical integrated circuit 134 may be positioned in an etched pit 210 (which is defined by edges or sides) in substrate 144. Note that substrate 144 may include: a ceramic, an organic material, a glass, and/or a semiconductor. In addition, note that integrated circuit 110 and/or optical integrated circuit 134 may be a physical-medium dependent integrated circuit. For example, the driver and/or the receiver circuit may be tailored to or specific to optical integrated circuit 134 (such as the type of optical source in optical integrated circuit 134). Similarly, optical integrated circuit 134 may be tailored to or specific to the optical signal and/or the other optical signal.

Additionally, chip package 100 may include an optical-fiber assembly 140 (which may include collection optics for an optical-fiber termination and/or an optical fiber) having end 142 facing end 112 and positioned above interposer 118 and optical integrated circuit 134, where optical-fiber assembly 140 partially overlaps interposer 118, and where optical integrated circuit 134 is positioned so that: the optical signal (shown by the dashed line in FIG. 1) is provided to optical-fiber assembly 140 through interposer 118, and/or the other optical signal (also shown by the dashed line in FIG. 1) is received from optical-fiber assembly 140 and is provided to optical integrated circuit 134 through interposer 118. Note that interposer 118 may include an optical component that, during operation of chip package 100: focuses the optical signal on optical-fiber assembly 140, and/or focuses the other optical signal on optical integrated circuit 134. For example, the optical component may include: a lens, a diffraction element, and/or a mirror. Consequently, interposer 118 may include glass that is optically transparent at a wavelength of: the optical signal and/or the other optical signal. Note that collection optics in optical-fiber assembly 140 may include a lens/mirror assembly. Furthermore, optical-fiber assembly 140 may include an optical fiber (or an optical-fiber array) that is either positioned vertically or horizontally (in which case, a mirror facet may be defined in the optical fiber).

In order to facilitate alignment of optical-fiber assembly 140, chip package 100 may include an alignment feature 148. In particular, alignment feature 148 may position optical-fiber assembly 140 relative to interposer 118 and optical integrated circuit 134. For example, optical-fiber assembly 140 may include an optical fiber having a core diameter of 50 μm and the alignment tolerance in chip package 100 may be ±5 μm. In this way, the optical signal may be provided to optical-fiber assembly 140 through interposer 118, and/or the other optical signal may be provided to optical integrated circuit 134 through interposer 118.

Figure 2:
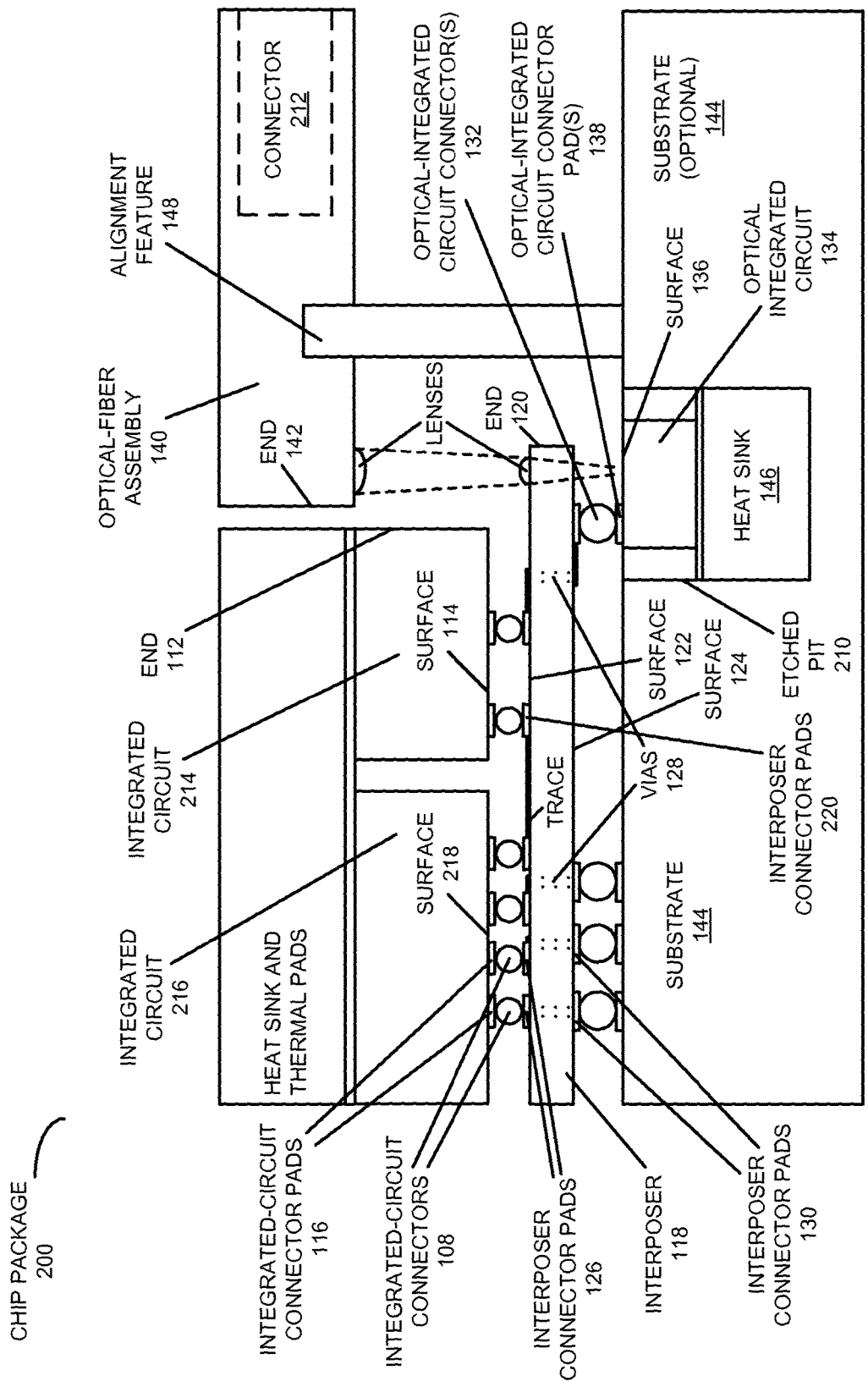
FIG. 2 is a block diagram illustrating a side view of a chip package in accordance with an embodiment of the present disclosure.

While FIG. 1 illustrates a particular embodiment of the chip package, a number of variations on this architecture may be used. This is shown in FIG. 2, which presents a block diagram illustrating a side view of a chip package 200. As noted previously, in this chip package optical integrated circuit 134 may be included in etched pit 210. Moreover, chip package 200 may include a connector 212 that remateably couples to optical-fiber assembly 140. For example, connector 212 may include a plug or a detachable ferrule to which optical-fiber assembly 140 can remateably couple. Furthermore, the functionality of integrated circuit 110 in FIG. 1 may be divided into two integrated circuits. In particular, chip package 200 may include integrated circuit 214 and integrated circuit 216. Integrated circuit 214 may include: the driver circuit of the electrical signal for the optical source in optical integrated circuit 134, and/or the receiver circuit of the other electrical signal from the optical receiver in optical integrated circuit 134. Furthermore, integrated circuit 216 may have a surface 218 with one or more integrated-circuit connector pads 116, where surface 218 faces surface 122. One or more integrated-circuit electrical connectors 108 may be electrically coupled to the one or more integrated-circuit connector pads 116, and one or more interposer connector pads 126 on surface 122 may be electrically coupled to the one or more integrated-circuit electrical connectors 108. In addition, one or more traces on surface 122 may be electrically coupled to one or more interposer connector pads 126 and to one or more interposer connector pads 220. For example, vias 128 may be used for routing to traces on either or both of the surfaces of interposer 118 (such as two planes that are used to route high-speed signals). The one or more interposer connector pads 220 may be electrically coupled to one or more integrated-circuit electrical connectors 108, which may be electrically coupled to one or more integrated-circuit connector pads 116 on surface 114.

During operation, integrated circuit 216 may output the electrical signal to integrated circuit 214 via interposer 118. Then, the driver in integrated circuit 214 may output the electrical signal to optical integrated circuit 134 via interposer 118, and the optical source in optical integrated circuit 134 may output the optical signal to optical-fiber assembly 140. Similarly, optical integrated circuit 134 may receive the other optical signal and may output the other electrical signal to integrated circuit 214 via interposer 118. The receiver circuit in integrated circuit 214 may receive the other electrical signal, and may output the other electrical signal to integrated circuit 216 via interposer 118. While this communication may involve a large number of moderate-speed rated off-chip interconnects on integrated circuits 214 and 216 (or integrated circuit 110 in FIG. 1), this configuration may minimize the wire-length of ultrahigh speed electrical signals between the I/O integrated circuit in integrated circuit 214 (or integrated circuit 110 in FIG. 1) and optical integrated circuit 134. In addition, the configuration shown in FIG. 2 may allow for the use of integrated circuit 216, which may omit the specific circuits for direct electrical interaction with optical integrated circuit 134 by using intermediary integrated circuit 214.

Integrated circuits 110 (FIG. 1) and 214 may include an (input/output) I/O integrated circuit that serializes/deserializes data in the electrical signals and/or that interfaces optical integrated circuit 134 with energy-efficient photonic driver and receiver circuits. Thus, the I/O integrated circuit may accept parallel data from integrated circuit 110 (FIG. 1) or 214, serialize the data and encode the data onto a photonic-modulator driver signal. Conversely, the I/O integrated circuit may accept serial electrical data from the photodetectors on optical integrated circuit 134, and may convert the electrical data into parallel inputs to transmit electrically to integrated circuit 110 (FIG. 1) or 214. However, other combinations of serial or parallel data transmission may also be used. In some embodiments, the integrated circuit-I/O integrated circuit interface consists of multiple moderate-speed electrical links (e.g., 1-5 Gbps per channel), whereas the I/O integrated circuit-optical integrated circuit interface may include a smaller number of high-speed serial links (e.g., greater than 14 Gbps per channel). For example, integrated circuit 214 may function as a signal conditioner using an off-the-shelf vertical-cavity-surface-emitting-laser driver or a transimpedance amplifier (which would often be in a pluggable module). In this example, the outputs of integrated circuit 216 may not need to be modified, thereby providing cost savings because the electrical signals may be in the ultrahigh speed input/output integrated circuit.

While not shown in FIGS. 1 and 2, interposer 118 and substrate 144 may include multiple layers of wiring on surfaces for signal and power ground routing, as well as redistribution. Therefore, the TIVs in interposer 118 may convey power and ground to integrated circuits 110 (FIG. 1) and 214, and/or substrate 144 may convey power and ground to optical integrated circuit 134. Furthermore, FIGS. 1 and 2 may be used with edge (or horizontal) coupling or vertical coupling of optical-fiber assembly 140. As noted previously, horizontal coupling may involve the use of additional mirrors, lenses and/or optical coupling elements.

In some embodiments, chip packages 100 (FIG. 1) and/or 200 include an optional thermal-cooling mechanism on a back surface of integrated circuits 110 (FIG. 1), 214 and/or 216. This optional thermal-cooling mechanism may include a heat sink. Moreover, the heat sink may have some topology if the chips have different heights. In addition, in some embodiments chip packages 100 (FIG. 1) and/or 200 include control logic that implements a thermal-management technique for optical integrated circuit 134.

Note that interposer 118 may support dense redistribution wiring layers on surfaces 122 and/or 124 to allow for physical transformation of pad/bump pitch between the two sides of interposer 118. In general, the integrated-circuit side of interposer 118 may have a much tighter pad pitch than the chip-package side. Furthermore, interposer 118 may be made of silicon, a glass, a ceramic and/or an organic material having a coefficient of thermal expansion that is very close to that of silicon. For example, interposer 118 may include borosilicate glass. This feature may provide the thermo-mechanical latitude to use shorter and higher-density bumps on chips, but also to allow the chips to be bonded very close together.

Moreover, note that the physical-medium dependent integrated circuit in the preceding embodiments is, in general, distinct from so-called 'optical engines,' which include packaged, purpose-built electro-optical converter blocks.

In an exemplary embodiment, interposer 118 has a thickness of 100-150 µm. Moreover, a distance between surface 124 and a surface of optical integrated circuit 134 (i.e., the thickness of the one or more optical-integrated-circuit electrical connectors 132) may be 40-50 µm, and distance between the surface of optical integrated circuit 134 and optical-fiber assembly 140 may be one or more millimeters.

Figure 3:
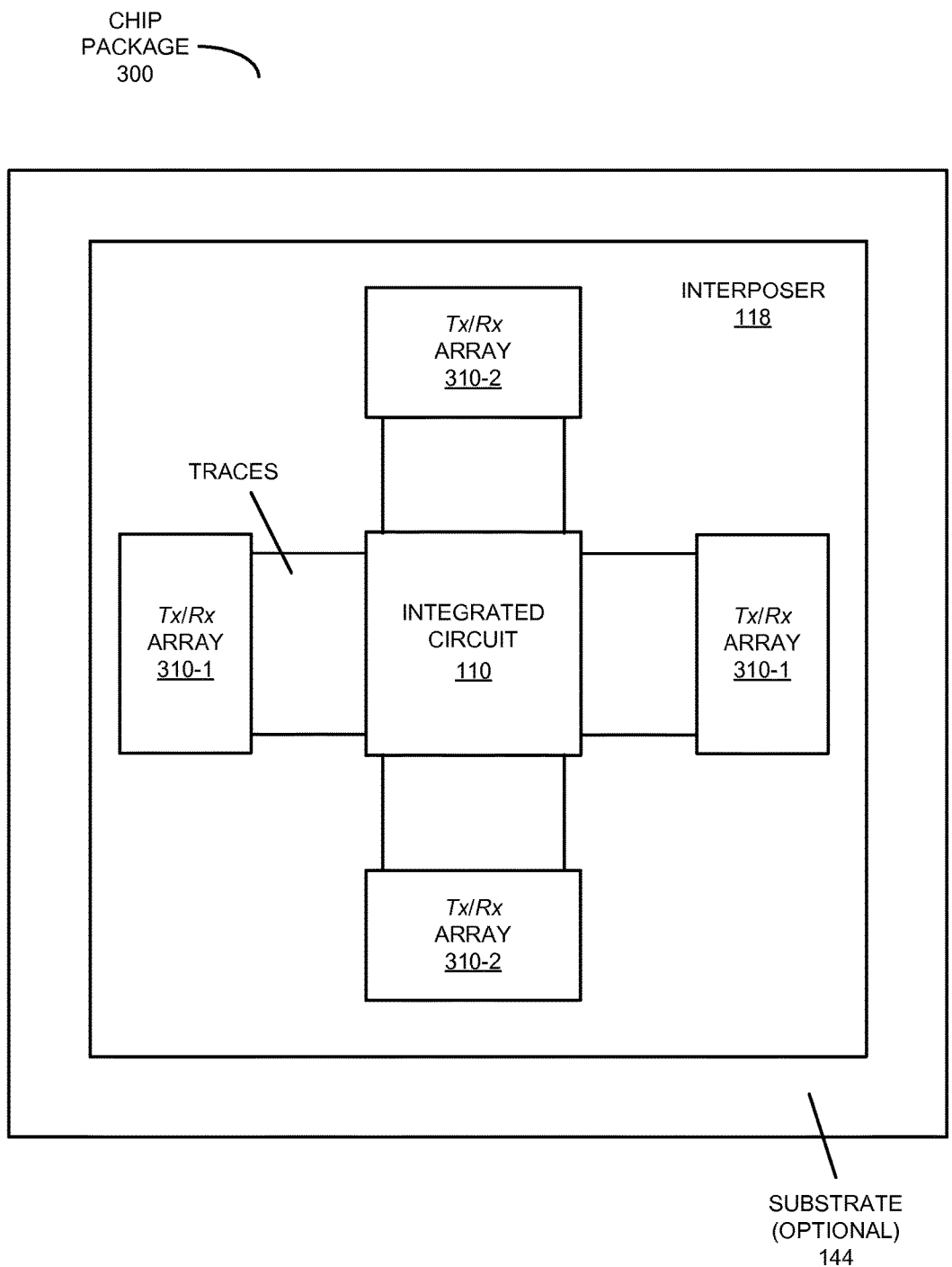
FIG. 3 is a block diagram illustrating a top view of one of the chip packages of FIG. 1 or 2 in accordance with an embodiment of the present disclosure.

In order to maximize the number of off-chip data channels, and therefore the bandwidth, in some embodiments the chip package includes multiple optical fibers with associated transmit and receive arrays. This is illustrated in FIG. 3, which presents a top view of a chip package 300. In particular, chip package 300 may include multiple instances of optical sources and optical detectors in the optical chip package, where the optical sources and the optical detectors have corresponding unidirectional electrical paths between the integrated circuit and the optical integrated circuit via traces on interposer 118. For example, a given optical source may be adjacent to a given optical detector, where the corresponding unidirectional electrical paths for the optical sources may be interleaved with the corresponding unidirectional electrical paths for the optical detectors. Note that transmit (Tx)/receive (Rx) arrays 310 in FIG. 3 may be included in instances of optical integrated circuit 134 (FIGS. 1 and 2), which output to and receive optical signals from optical fibers (not shown).

Figure 4:
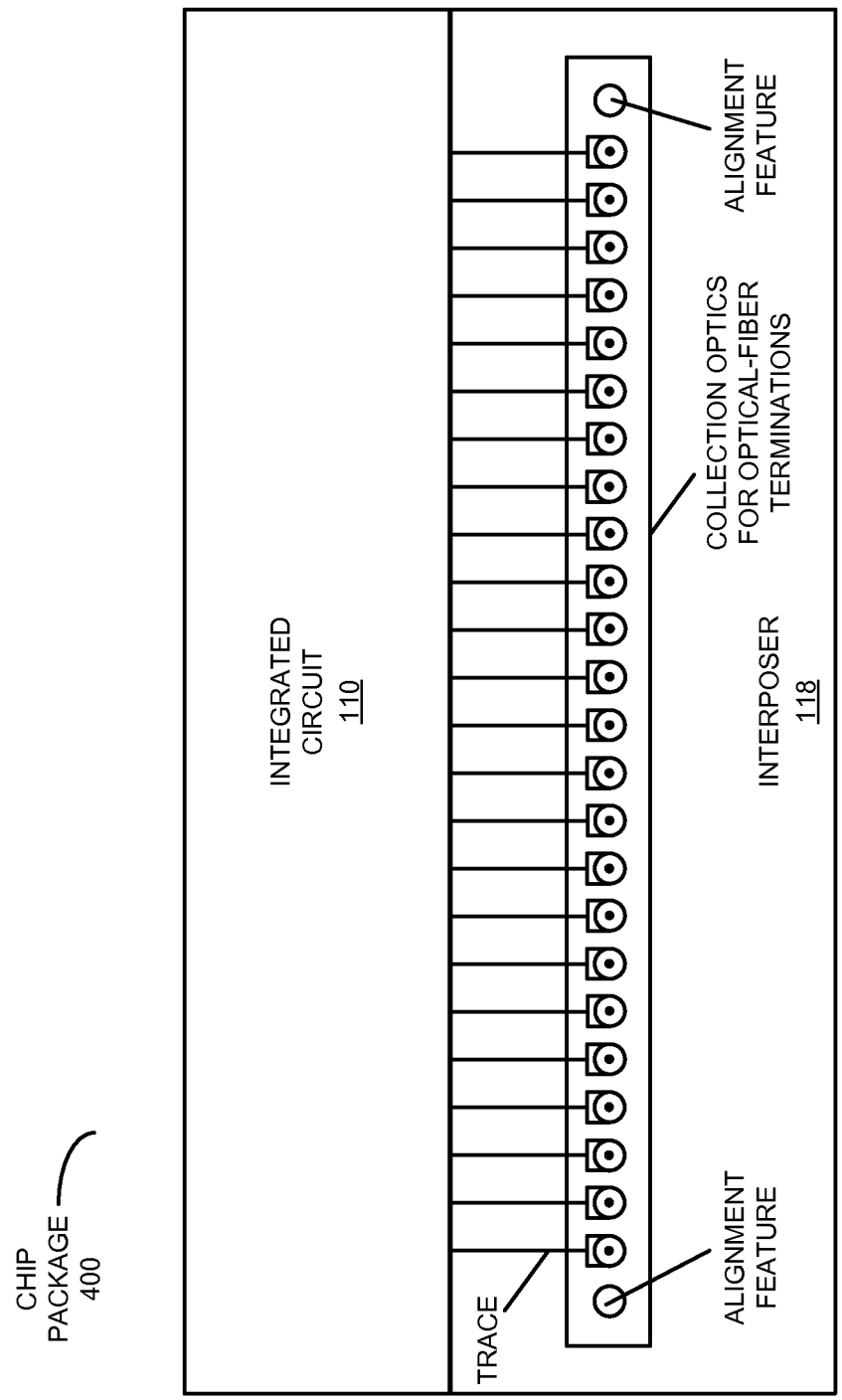
FIG. 4 is a block diagram illustrating a top view of a portion of one of the chip packages of FIG. 1 or 2 in accordance with an embodiment of the present disclosure.

Alternatively or additionally, the optical sources may be arranged in groups of N and the optical detectors may be arranged in groups of M, where the corresponding unidirectional electrical paths for the optical sources are arranged adjacent to each other in groups of N and the corresponding unidirectional electrical paths for the optical detectors may be arranged adjacent to each other in groups of M. For example, N or M may be 2, 4, 6, 8, 12, 16, 24, 32, 48, 64, 128 or 256 (more generally, N or M may be integers). This is shown in FIG. 4, which presents a top view of a portion of chip package 400. In this example, the electrical traces to the photonic devices and the optical apertures are arranged in groups. Note that the locations of the optical apertures are in-line with the alignment pin holes or features.

Thus, the transmit and receive links in the chip package may be adjacent to each other or separate (i.e., alternating or in blocks) in chip packages 300 (FIG. 3) and 400.

The chip package may address performance limitations in existing high-performance computing or computer systems. In these computing systems, interconnects often play an important role in defining the overall performance. For the purpose of this disclosure, the interconnects between the processors and memory via switch chips are considered. In general, the serializer-deserializer (SerDes) I/O blocks on the processor push high data rates in or out of the chip. Typically, a large number of signal-count pins are needed in order for high aggregate data rates to be transmitted between processors. However, finite reticle sizes usually limit the pin-count on the processor die. Furthermore, the improvement in pin density anticipated over the next few years is minimal because of packaging/assembly manufacturing constraints. Therefore, each I/O port in a processor usually needs to deliver signals at much higher data rates. Current data rates supported by the I/O blocks are 10-15 Gbps per pin (using 40 nm and 28 nm process technology nodes) and these are steadily migrating to 20-28 Gbps. The comparable InfiniBand extended data rate (EDR) is 25.78 Gbps. These data rates typically require that the SerDes I/O blocks in the processor support these high data rates at low-enough power and low latency. Note that at 20 Gbps and higher data rates, the number of differential pins required to push high aggregate bandwidths is expected to be more than 1000.

In addition, transmission lines on the system platform(s) are usually needed to support these higher data rates while providing connectivity to a larger number of nodes. However, transmission lines often cause signal impairments because of: high-frequency attenuation (from the dominant signal loss mechanism and reflections), crosstalk, crossover of traces, and skew variation between channels. Even with migrating (at increased cost) to low-loss dielectric materials for the system platforms, there is only a finite transmission distance-bandwidth product (TDBP) that can be supported with electrical transmission lines. Designers often resort to several circuit-level improvements (such as a transmitter finite-impulse-response filter, analog linear equalizer, adaptive decision feedback equalization, etc.), and timing recovery to provide longer interconnect distances on the system platform. All these features add to the power dissipated and increase latency. Furthermore, techniques such as back-drilling of vias on the system-platform circuit boards and impedance matching may be used to maximize the TDBP. In spite of these techniques, the electrical interconnects seem to limit the scalability of such systems.

In the present disclosure, photonic interconnects are used to overcome these limitations. In general, systems that use photons for data communications typically need to be compact and offer extremely high performance at low cost and power. For example, parallel optical interconnection modules or wavelength-division-multiplexed optical modules can replace electrical interconnects because of advantages such as: high bandwidth, large interconnect reach, low loss, low crosstalk, low power consumption and electromagnetic immunity. However, at planned next-generation EDR serial data rates and above, the impairments suffered along the electrical path from the chip to an external optical transceiver typically require not only equalization but also timing recovery, both of which significantly add to: the power consumption, heat generation, size and cost of the optical transceiver and the system as a whole. By improving the integrity of the electrical signaling path (e.g., by bringing the transceiver as close as possible to the packaged chip), timing recovery may not be required. In addition, the disclosed embodiments of the chip package may avoid the substantial overhead in the driving electronics and subsequent power consumption when the optical components are packaged separately from the remainder of the chip. Thus, the chip package may co-package the processor, switch, and/or memory chip with the optical components (that include the photonic interconnect) in order to reduce complexity, cost, and power consumption.

In particular, the chip package may include active photonic components in close proximity to the processor, memory and/or switch integrated circuit to greatly reduce (or in some cases eliminate) the need for high-speed electrical interfaces between the packaged integrated circuit and the printed circuit board on which it is installed. Chip packages 100 (FIG. 1) and 200 (FIG. 2) may use a common glass interposer 118 with through-glass vias (such as vias 128 in FIGS. 1 and 2) to enable flip-chip bonding. In both of these embodiments, interposer 118 may be used to electrically connect the high-speed, low-speed and power traces to the chip package and other circuit blocks. Interposer 118 may also provide the optical coupling path to/from the optical source and optical receiver, respectively. Note that interposer 118 may be thermally matched to silicon and, thus, may not cause warp or deformation on the larger integrated circuit(s). In chip package 100 in FIG. 1, the high-speed I/O blocks in integrated circuit 110 may directly connect to the photonic components in optical integrated circuit 134 via traces routed on and through interposer 118, while in chip package 200 in FIG. 2 an intervening specialized integrated circuit 214 in a different technology is used. In both embodiments, the substrate 144, which may connect to the host printed circuit board for connections for power, ground, low-speed signaling, and some high-speed lanes, may have been prepared to interface with the flip-chip bonded photonic devices via etched-through holes or wells (per chip packages 100 and 200, respectively), heat sinks, and/or conformant thermal pads.

Note that interposer 118 may include alignment features to allow for accurate installation of separable or permanently installed collection optics for optical-fiber terminations (per chip packages 100 and 200, respectively). Moreover, interposer 118 may include one or more lenses or other optical features patterned over the corresponding locations of the photonic devices (as depicted in chip package 100 in FIG. 1) or may be left flat (per chip package 200 in FIG. 2), as any substrate left over or above the photonic components may form part of the optical path coupling it to optical-fiber assembly 140. In addition, other features may be patterned to aid with alignment or for other uses as desired. The techniques used in chip packages 100 and 200 (or in other similar systems) may not be used solely throughout the entirety of the chip package, but may be used in part at the designer's discretion. For example, an optical receiver may not need a heat sink to provide heat mitigation because, in general, it will not generate a significant amount of heat (unlike a semiconductor laser diode and, more generally, an optical source).

The chip package may be assembled using the following technique. In this discussion, a glass interposer is used as an illustration. The glass interposer with well-defined locations for through-glass vias may be patterned and filled with copper or another conductive material. Then, traces and pads may be defined at locations on the top and bottom surfaces of the glass interposer. Moreover, bump metallurgy may be defined for the top-surface pads (to attach with silicon chips), bump metallurgy may be defined for the bottom-surface pads (e.g., to attach with a vertical-cavity surface-emitting laser array and/or PIN photo-diode array in the optical integrated circuit), and bumps may be applied on the bottom surface of the glass interposer.

Next, the integrated circuit (such as switch chip) may be flip-chip attached on the top surface of the glass interposer. These bumps may have a maximum temperature $T_1$ (above which the bumps melt or reflow) that is suitable for the bump metallurgy for the top surface.

Subsequently, an underfill material may be applied between the glass interposer and the integrated circuit.

Furthermore, the vertical-cavity surface-emitting laser array and/or PIN photo-diode array in the optical integrated circuit may be flip-chip attached to the bottom surface of the glass interposer. These bumps may have a maximum temperature $T_2$ (above which the bumps melt or reflow) that is suitable for the bump metallurgy for the bottom surface (e.g., $T_1$ may be greater than $T_2$). Note that a transparent underfill may be applied between the interposer and the optical integrated circuit.

Additionally, the bottom surface of the glass interposer with bumps may be attached to the substrate or printed circuit board. These bumps may have a maximum temperature $T_3$ (above which the bumps melt or reflow) that is suitable for the bump metallurgy for the substrate or printed circuit board (e.g., $T_1$ may be greater than $T_2$, which may be greater than $T_3$).

Finally, connectors may be positioned with respect to locations of guide holes/pins on the glass interposer.

The chip package may include a variety of features to improve performance. In particular, the glass interposer may provide a direct connection between the integrated circuit and photonic component(s) in the optical integrated circuit using metal traces, electrical vias, and bump-bonded pads. Moreover, the glass interposer may bridge the integrated circuit and the optical integrated circuit, and may bridge the optical integrated circuit and the photonic component(s) using metal traces, electrical vias, and bump-bonded pads. The interposer may also provide connections between the integrated circuit and a substrate (such as a printed circuit board) that follow conventional packaging design techniques, but may include features to accommodate the photonic components and the alignment of optical systems with these components. Thus, the interposer may include power, ground, and low-speed communications connections, as well as high-speed traces for use with external transceivers (as needed).

Furthermore, the substrate may accommodate the photonic components in the optical integrated circuit using etched or milled/drilled wells or holes, heat sinks or spreaders, thermally conductive pads, and/or other technologies. Note that the vertical-cavity surface-emitting laser array and/or PIN photo-diode array in the optical integrated circuit may be mounted on the bottom surface of the glass interposer, and the optical-fiber assembly and collecting optics may be self-aligned by flip-chip bonding to the defined locations. Thus, the glass interposer may include lenses or other features patterned upon its surface for a variety of uses, including but not limited to: optical-beam control, alignment assistance, thermal management, and/or handling/processing features.

Additionally, multiple arrays of devices may be used at a time, with routing occurring on both of the interposer surface planes, and taking advantage of through-interposer vias for flexibility. The distribution of transmit and receive ports (which may be separate or together) may depend upon the layout and architecture of the integrated circuit.

In an exemplary embodiment, the photonic components are based on vertical-cavity surface-emitting laser technology using carrier wavelengths such as 850 nm, 1310 nm and/or 1550 nm, with corresponding gallium-arsenide or indium-phosphide detector technology. Surface-emitting lasers based on lateral cavities possessing integral reflectors may also be used.

In some embodiments, the package encapsulation above the substrate includes either fixed or detachable (i.e., remateable) optical-fiber terminations or collection optics.

Thus, the chip package may incorporate photonic I/O ports with high-speed digital integrated circuits to provide low-power, high-bandwidth interconnects having low latencies with excellent electromagnetic-interference suppression and thermal-management features. This chip package may facilitate excellent cable management (in which bulky copper cables are replaced by optical-fiber ribbons) and also unconstrained airflow within the system. Consequently, the reliability of such a system may be significantly enhanced.

Figure 5:
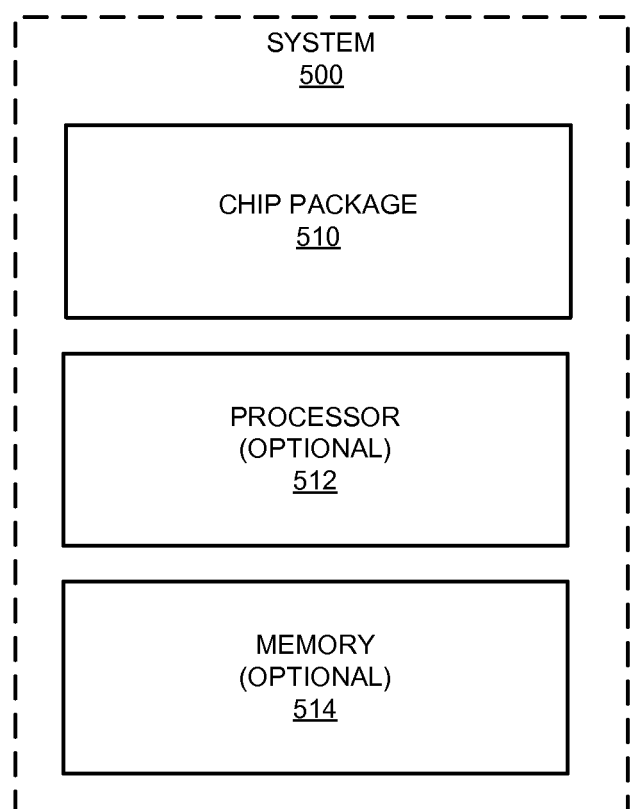
FIG. 5 is a block diagram illustrating a system that includes a chip package in accordance with an embodiment of the present disclosure.

Embodiments of the chip package may be used in a wide variety of applications. FIG. 5 presents a block diagram illustrating a system 500 that includes a chip package 510, such as one of the preceding embodiments of the chip package. This system may include an optional processor 512 and/or an optional memory 514, which may be coupled to each other and chip package 510 by a bus (not shown). Note that optional processor (or processor core) 512 may support parallel processing and/or multi-threaded operation.

Optional memory 514 in system 500 may include volatile memory and/or non-volatile memory. More specifically, optional memory 514 may include: ROM, RAM, EPROM, EEPROM, flash, one or more smart cards, one or more magnetic disc storage devices, and/or one or more optical storage devices. Moreover, optional memory 514 may store an operating system that includes procedures (or a set of instructions) for handling various basic system services for performing hardware-dependent tasks. Moreover, optional memory 514 may also store communication procedures (or a set of instructions) in a communication module. These communication procedures may be used for communicating with one or more computers, devices and/or servers, including computers, devices and/or servers that are remotely located with respect to the system 500.

Furthermore, optional memory 514 may also include one or more program modules (or sets of instructions). Note that the one or more program modules may constitute a computer-program mechanism. Instructions in the various modules in optional memory 514 may be implemented in: a high-level procedural language, an object-oriented programming language, and/or in an assembly or machine language. The programming language may be compiled or interpreted, i.e., configurable or configured, to be executed by optional processor (or processor core) 512.

System 500 may include, but is not limited to: a server, a laptop computer, a communication device or system, a personal computer, a work station, a mainframe computer, a blade, an enterprise computer, a data center, a portable-computing device, a tablet computer, a cellular telephone, a supercomputer, a network-attached-storage (NAS) system, a storage-area-network (SAN) system, an electronic device, and/or another electronic computing device.

Note that embodiments of the chip package may be used in a variety of applications, including: VLSI circuits, communication systems (such as in wavelength division multiplexing), storage area networks, data centers, networks (such as local area networks), memory systems and/or computer systems (such as multiple-core processor computer systems). For example, the chip package may be included in a backplane that is coupled to multiple processor blades, or the chip package may couple different types of components (such as processors, memory, input/output devices, and/or peripheral devices). Thus, the chip package may perform the functions of: a switch, a hub, a bridge, and/or a router.

In general, system 500 may be at one location or may be distributed over multiple, geographically dispersed locations. Moreover, some or all of the functionality of system 500 may be implemented in one or more application-specific integrated circuits (ASICs) and/or one or more digital signal processors (DSPs). Furthermore, functionality in the preceding embodiments may be implemented more in hardware and less in software, or less in hardware and more in software, as is known in the art.

The preceding embodiments may include fewer components or additional components. For example, components in the chip package may be electrically coupled to each other using proximity-communication (P×C) connectors on surfaces of the components, such as: capacitive P×C connectors, inductive P×C connectors, conductive P×C connectors, and/or optical P×C connectors. Alternatively or additionally, the connectors may include compression-compliant microspring connectors. Moreover, components or features in one in embodiment may be used in another of the embodiments.

In addition to alignment feature 148 (FIGS. 1 and 2), the chip package may also include additional features that facilitate assembly and that may help maintain in-plane (XY) alignment of components. In particular, components (such as interposer 118 and/or optical integrated circuit 134 in FIG. 1) may be mechanically coupled to substrate 144 in FIG. 1 by pairs of negative features on surfaces and positive features that mate with the corresponding pairs of negative features. For example, the negative features may include pits (or holes) that are recessed below surfaces 122 and/or 124 in FIG. 1, and the positive features may include spherical balls (or pins) that mate with the negative features (such as a ball-and-etch-pit structure), thereby aligning the components. (Alternatively or additionally, alignment in the chip package may be facilitated using positive features on surfaces 122 and/or 124 in FIG. 1, where these positive features protrude above these surfaces). In some embodiments, the pairs of negative features are proximate to corners of the components.

As noted above, mating the negative features and the positive features can provide highly accurate self-alignment in the XY plane of the components, as well as coplanarity control during assembly. For example, the alignment over surfaces 114, 122 and/or 124 in FIG. 1 may be within ±1 μm in the XY plane.

In some embodiments, components in the chip package are permanently attached after remateable alignment, for example, by using a post-alignment technique to permanently fix the chip-to-chip alignment. In particular, solder may be partially melted or reflowed at an elevated temperature to fuse components in the chip package to create a more permanent bond. However, in other embodiments, components in the chip package are remateably coupled, thereby facilitating rework of the chip package.

Moreover, although the chip package and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Furthermore, features in two or more of the preceding embodiments may be combined with one another.

While the preceding embodiments illustrated interposer 118 (FIGS. 1 and 2) in the optical path, in some embodiments end 120 (FIGS. 1 and 2) of interposer 118 (FIGS. 1 and 2) is part way over the optical integrated circuit or interposer 118 (FIGS. 1 and 2) includes a cut out (i.e., the interposer is not included in the optical path).

Note that surfaces on components should be understood to include surfaces of substrates or surfaces of layers deposited on these substrates (such as a dielectric layer deposited on a substrate). Additionally, note that components in the chip package may be fabricated, and the chip package may be assembled, using a wide variety of techniques, as is known to one of skill in the art.

Figure 6:
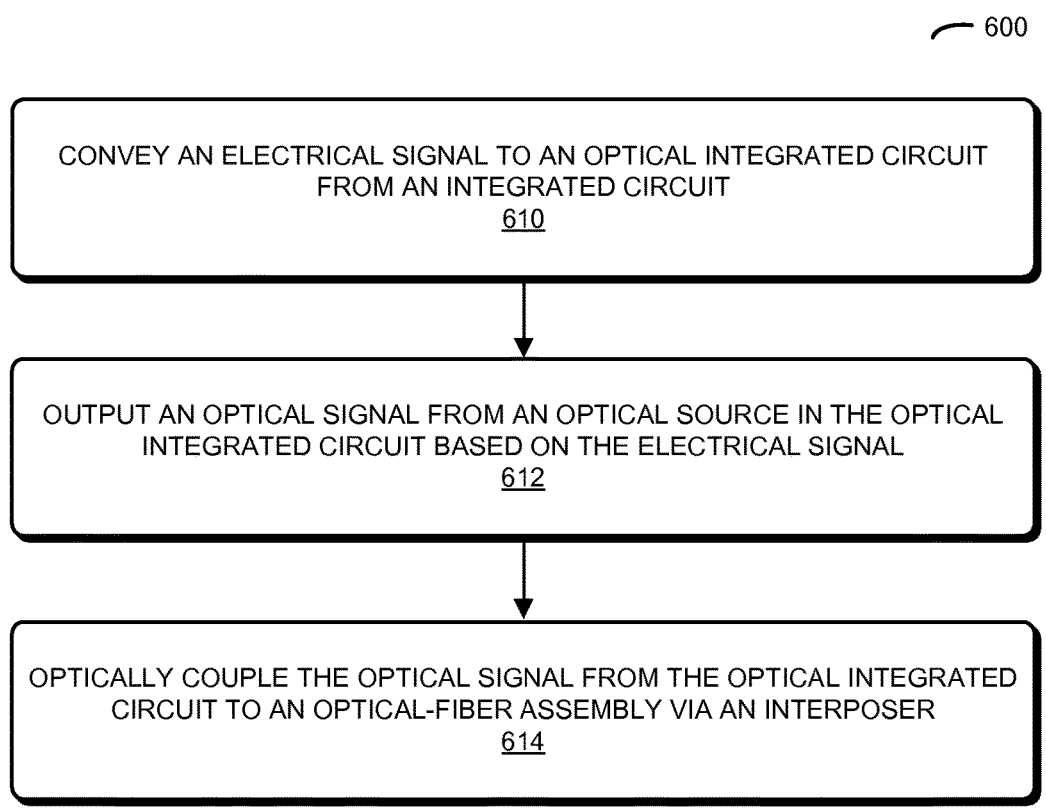
FIG. 6 is a flow diagram illustrating a method for communicating information in a chip package in accordance with an embodiment of the present disclosure.

We now describe the method. FIG. 6 presents a method 600 for communicating information, which may be performed by the chip package (such as chip package 100 in FIG. 1 or chip package 200 in FIG. 2). During operation, an integrated circuit conveys an electrical signal to an optical integrated circuit (operation 610) via a unidirectional electrical path, where the integrated circuit includes a driver circuit of the electrical signal for an optical source in the optical integrated circuit, where the unidirectional electrical path is mediated by an interposer having vias that is between the integrated circuit and the optical integrated circuit, and where an end of the interposer extends past an end of the integrated circuit. Moreover, the optical source in the optical integrated circuit outputs the optical signal based on the electrical signal (operation 612). Furthermore, the interposer optically couples the optical signal to an optical-fiber assembly (operation 614), where the optical-fiber assembly has an end facing the end of the integrated circuit and is positioned above the interposer and the optical integrated circuit, and where the optical-fiber assembly partially overlaps the interposer.

In some embodiments, method 600 includes additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A chip package, comprising:
   an integrated circuit having an end and a front surface with an integrated-circuit connector pad, wherein the integrated circuit includes at least one of: a driver circuit of an electrical signal for an optical source in an optical integrated circuit, and a receiver circuit of a second electrical signal from an optical receiver in the optical integrated circuit;
   an integrated-circuit electrical connector electrically coupled to the integrated-circuit connector pad;
   an interposer having an end, a top surface and a bottom surface, wherein the end of the interposer is horizontally displaced from the end of the integrated circuit, wherein the top surface faces the front surface and has a first interposer connector pad electrically coupled to the integrated-circuit electrical connector, and wherein the bottom surface is on an opposite side of the interposer from the top surface and has a second interposer connector pad electrically coupled to the first interposer connector pad by a via through the interposer, wherein the interposer includes an optical component to focus optical signal;

an optical-integrated-circuit electrical connector electrically coupled to the second interposer connector pad;

an optical integrated circuit having a front surface, facing the bottom surface of the interposer, with an optical-integrated-circuit connector pad electrically coupled to the optical-integrated-circuit electrical connector, wherein the optical integrated circuit includes at least one of: the optical source configured to output an optical signal based on the electrical signal, and the optical receiver configured to receive a second optical signal and to output the second electrical signal; and an optical-fiber assembly having an end facing the end of the integrated circuit and positioned above the interposer and the optical integrated circuit, wherein the optical-fiber assembly partially overlaps the interposer, wherein the optical-fiber assembly comprises collection optics for an optical-fiber termination, and wherein the optical-fiber assembly further comprises multiple optical apertures that are in-line with alignment features of the optical-fiber assembly; and wherein the optical integrated circuit is positioned so that at least one of: the optical signal is provided to the optical-fiber assembly through the interposer, and the second optical signal is received from the optical-fiber assembly and is provided to the optical integrated circuit through the interposer; and wherein the chip package further comprises a substrate, wherein the substrate comprises a through hole or an etched pit, and wherein the optical integrated circuit is disposed in the through hole or the etched pit.

2. The chip package of claim 1, wherein the interposer includes a trace on at least one of the front surface and the bottom surface that is electrically coupled to the first interposer connector pad and the second interposer connector pad; and wherein the trace horizontally displaces the first interposer connector pad and the second interposer connector pad.

3. The chip package of claim 1, wherein the optical integrated circuit is coupled to the substrate by a heat sink.

4. The chip package of claim 3, wherein the optical integrated circuit is positioned in one of: a hole, defined by first sides through the substrate, and an etched pit, defined by second sides, in the substrate.

5. The chip package of claim 1, wherein the interposer includes an optical component configured to at least one of: focus the optical signal on the optical-fiber assembly, and focus the second optical signal on the optical integrated circuit.

6. The chip package of claim 1, wherein the chip package further includes a connector configured to remateably couple to the optical-fiber assembly.

7. The chip package of claim 1, wherein the chip package further includes an alignment feature configured to position the optical-fiber assembly relative to the interposer and the optical integrated circuit.

8. The chip package of claim 1, wherein the chip package further includes:

a second integrated circuit having a front surface with a second integrated-circuit connector pad, wherein the front surface of the second integrated circuit faces the top surface of the interposer;

a second integrated-circuit electrical connector electrically coupled to the second integrated-circuit connector pad;

a third interposer connector pad on the top surface of the interposer electrically coupled to the second integrated-circuit electrical connector;

a trace on the top surface electrically coupled to the third interposer connector pad;

a fourth interposer connector pad on the top surface of the interposer electrically coupled to the trace;

a third integrated-circuit electrical connector electrically coupled to the fourth interposer connector pad; and a third integrated-circuit connector pad on the front surface of the integrated circuit and electrically coupled to the third integrated-circuit electrical connector.

9. The chip package of claim 1, wherein the integrated circuit includes a physical-medium dependent integrated circuit.

10. The chip package of claim 1, wherein the interposer includes glass that is optically transparent at a wavelength of at least one of: the optical signal and the second optical signal.

11. The chip package of claim 1, wherein the communication between the integrated circuit and the optical integrated circuit is unidirectional.

12. The chip package of claim 1, wherein the chip package includes multiple instances of optical sources and optical detectors in the optical chip package; and wherein the optical sources and the optical detectors have corresponding unidirectional electrical paths between the integrated circuit and the optical integrated circuit via the interposer.

13. The chip package of claim 12, wherein a given optical source is adjacent to a given optical detector; and wherein the corresponding unidirectional electrical paths for the optical sources are interleaved with the corresponding unidirectional electrical paths for the optical detectors.

14. The chip package of claim 12, wherein the optical sources are arranged in groups of N and the optical detectors are arranged in groups of M; and wherein the corresponding unidirectional electrical paths for the optical sources are arranged adjacent to each other in groups of N and the corresponding unidirectional electrical paths for the optical detectors are arranged adjacent to each other in groups of M.

15. A system, comprising:

a processor;

a memory coupled to the processor; and a chip package, wherein the chip package includes:

an integrated circuit having an end and a front surface with an integrated-circuit connector pad, wherein the integrated circuit includes at least one of: a driver circuit of an electrical signal for an optical source in an optical integrated circuit, and a receiver circuit of a second electrical signal from an optical receiver in the optical integrated circuit;

an integrated-circuit electrical connector electrically coupled to the integrated-circuit connector pad;

an interposer having an end, a top surface and a bottom surface, wherein the end of the interposer is horizontally displaced from the end of the integrated circuit, wherein the top surface faces the front surface and has a first interposer connector pad electrically coupled to the integrated-circuit electrical connector, and wherein the bottom surface is on an opposite side of the interposer from the top surface and has a second interposer connector pad electrically coupled to the first interposer connector pad by a via through the interposer, wherein the interposer includes an optical component to focus optical signal;

an optical-integrated-circuit electrical connector electrically coupled to the second interposer connector pad;

an optical integrated circuit having a front surface, facing the bottom surface of the interposer, with an optical-integrated-circuit connector pad electrically coupled to the optical-integrated-circuit electrical connector, wherein the optical integrated circuit includes at least one of: the optical source configured to output an optical signal based on the electrical signal, and the optical receiver configured to receive a second optical signal and to output the second electrical signal; and an optical-fiber assembly having an end facing the end of the integrated circuit and positioned above the interposer and the optical integrated circuit, wherein the optical-fiber assembly partially overlaps the interposer, wherein the optical-fiber assembly comprises collection optics for an optical-fiber termination, and wherein the optical-fiber assembly further comprises multiple optical apertures that are in-line with alignment features of the optical-fiber assembly; and wherein the optical integrated circuit is positioned so that at least one of: the optical signal is provided to the optical-fiber assembly through the interposer, and the second optical signal is received from the optical-fiber assembly and is provided to the optical integrated circuit through the interposer; and wherein the chip package further comprises a substrate, wherein the substrate comprises a through hole or an etched pit, and wherein the optical integrated circuit is disposed in the through hole or the etched pit.

16. The system of claim 15, wherein the interposer includes an optical component configured to at least one of: focus the optical signal on the optical-fiber assembly, and focus the second optical signal on the optical integrated circuit.

17. The system of claim 15, wherein the chip package further includes:
a second integrated circuit having a front surface with a second integrated-circuit connector pad, wherein the front surface of the second integrated circuit faces the top surface of the interposer;
a second integrated-circuit electrical connector electrically coupled to the second integrated-circuit connector pad;
a third interposer connector pad on the top surface of the interposer electrically coupled to the second integrated-circuit electrical connector;
a trace on the top surface electrically coupled to the third interposer connector pad;
a fourth interposer connector pad on the top surface of the interposer electrically coupled to the trace;
a third integrated-circuit electrical connector electrically coupled to the fourth interposer connector pad; and
a third integrated-circuit connector pad on the front surface of the integrated circuit and electrically coupled to the third integrated-circuit electrical connector.

18. The system of claim 15, wherein the communication between the integrated circuit and the optical integrated circuit is unidirectional.

19. The system of claim 15, wherein the interposer includes glass that is optically transparent at a wavelength of at least one of: the optical signal and the second optical signal.

20. A method for communicating information, wherein the method comprises:
conveying an electrical signal from an integrated circuit to an optical integrated circuit via a unidirectional electrical path, wherein the integrated circuit includes a driver circuit of the electrical signal for an optical source in the optical integrated circuit, wherein the unidirectional electrical path is mediated by an interposer having vias that is between the integrated circuit and the optical integrated circuit, and wherein an end of the interposer extends past an end of the integrated circuit, wherein the interposer includes an optical component to focus optical signal;
outputting an optical signal using the optical source in the optical integrated circuit based on the electrical signal; and
optically coupling the optical signal to an optical-fiber assembly via the interposer, wherein the optical-fiber assembly has an end facing the end of the integrated circuit and is positioned above the interposer and the optical integrated circuit, wherein the optical-fiber assembly partially overlaps the interposer, wherein the optical-fiber assembly comprises collection optics for an optical-fiber termination, and wherein the optical-fiber assembly further comprises multiple optical apertures that are in-line with alignment features of the optical-fiber assembly, and
wherein the optical integrated circuit is positioned so that at least one of: the optical signal is provided to the optical-fiber assembly through the interposer, and a second optical signal is received from the optical-fiber assembly and is provided to the optical integrated circuit through the interposer; and
wherein the chip package further comprises a substrate, wherein the substrate comprises a through hole or an etched pit, and wherein the optical integrated circuit is disposed in the through hole or the etched pit.

* * * * *